(12) United States Patent  (10) Patent No.: US 9,113,413 B2
Ise  (45) Date of Patent: Aug. 18, 2015

(54) COMMUNICATION TERMINAL AND COMMUNICATION METHOD

(71) Applicant: KABUSHIKI KAISHA TOSHIBA, Tokyo (JP)

(72) Inventor: Kotaro Ise, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 18 days.

(21) Appl. No.: 13/790,094

(22) Filed: Mar. 8, 2013

(65) Prior Publication Data

US 2014/0029495 A1    Jan. 30, 2014

(30) Foreign Application Priority Data

Jul. 25, 2012  (JP) ................. 2012-165116

(51) Int. Cl.
*G08C 17/00* (2006.01)
*H04W 52/02* (2009.01)

(52) U.S. Cl.
CPC .......... *H04W 52/0222* (2013.01); *H04W 52/02* (2013.01); *H04W 52/0216* (2013.01)

(58) Field of Classification Search
CPC .................... H04W 52/0222; H04W 52/0216; H04W 52/02
USPC ........................................................ 370/311
See application file for complete search history.

(56) References Cited

U.S. PATENT DOCUMENTS

| 7,535,881 | B2 | 5/2009 | Maekawa et al. |
| 2005/0282573 | A1 | 12/2005 | Maeno |
| 2012/0127902 | A1 | 5/2012 | Muqattash |

FOREIGN PATENT DOCUMENTS

| JP | 2000-333259 | 11/2000 |
| JP | 2006-005577 | 1/2006 |
| JP | 2006-050020 | 2/2006 |
| JP | 2010-045536 | 2/2010 |
| JP | 2012-114915 | 6/2012 |

OTHER PUBLICATIONS

Irish et al., "A "Green TCP/IP" to Reduce Electricity Consumed by Computers", *Southeastcon '98, Proceedings, IEEE*, Apr. 24-26, 1998, pp. 302-305.
Office Action mailed May 30, 2014 in counterpart Japanese Patent Application No. 2012-165116 and English-language translation thereof.
Office Action mailed Dec. 5, 2014 in counterpart Japanese Patent Application No. 2012-165116 and English-language translation thereof.

*Primary Examiner* — Sai-Ming Chan
(74) *Attorney, Agent, or Firm* — Nixon & Vanderhye, P.C.

(57) ABSTRACT

An example communication terminal in which a plurality of communication protocols are executed includes a communication device configured to form an association with communication equipment; a communication managing unit configured to decide an operational mode of the communication device; and a device power managing unit configured to control power state of the communication device in accordance with an operational mode decided by the communication managing unit. A plurality of communication protocols (or a plurality of application software) are executed in the communication terminal and a frame to be transmitted is selected according to an execution situation of the communication protocols. The selected frame is transmitted via the association so that the association is maintained and a connection/session of the communication protocol of the selected frame is also maintained.

10 Claims, 13 Drawing Sheets

COMMUNICATION TERMINAL AND
COMMUNICATION METHOD

CROSS REFERENCE TO RELATED
APPLICATIONS

This application is based upon and claims the benefit of priority from the prior Japanese Patent Application No. 2012-165116 filed on Jul. 25, 2012, the entire contents of which are incorporated herein by reference.

FIELD

Embodiments described herein relate to communication terminals and communication methods.

BACKGROUND

With the development in communication technology, a terminal such as a smartphone that has a communication function is in widespread use. Meanwhile, societal demands on reducing power consumption of terminals are increasing due to concern for global warming. Further, for a battery-powered terminal such as a smartphone, there is a need for reducing power consumption of the terminal from the standpoint of the convenience by increasing run time thereof.

In response to the demands for reducing power consumption, a framework named ACPI (Advanced Configuration and Power Interface) for power supply control is being proposed. According to the above, a state named "S3" is defined. The "S3" is a state that is called "Suspend to RAM." In the "S3" state, a value in a register of a CPU is written out in a main memory, and feeding of power to the CPU, a bus, and bus devices are stopped while the main memory is kept in an energized state. A terminal in the "S3" state cannot carry out an operation, but power consumption thereof is smaller than in an "S0" state (an operating state). Further, when the terminal returns to the "S0" state from the "S3" state, the terminal can return to a state prior to transitioning to the "S3" state. Therefore, it is more convenient than a cold boot.

Further, there exists another technique: in a case where there is neither receiving nor transmitting packet for a predetermined period of time in a wireless LAN terminal, information that is necessary to transmit data to a connected access point is stored in the terminal, and feeding of power to a communication circuit is stopped. When a transmitting packet is generated, power is fed to the communication circuit, and the packet is transmitted to the access point having been connected to previously using the stored information without carrying out a connecting procedure. In this way, by omitting the procedure to connect to the access point, a delay that is required for transmitting a packet after power is fed to a communication unit is reduced.

In recent years, services called Web services or cloud services have been in widespread use. For example, Gmail by Google Incorporated or the like can be cited. With Gmail, mail data are present on a server, and by accessing them from a Web browser, a list of received mail and content of selected mail are displayed without using a dedicated mail application. When assuming such a service, from the standpoint of power consumption, it is desirable that a local terminal stops feeding power to a wireless LAN communication unit each time necessary data are received and feeds power to the wireless LAN communication unit only in a case where communication becomes necessary. However, a delay from when feeding of power to the wireless LAN communication unit is started until a packet can be transmitted is large, and the convenience for a user is lost.

On the contrary to this, there exists a method in which feeding of power to the wireless LAN communication unit is stopped while retaining information on the connected access point. When transmission of a packet becomes necessary, power is fed to the wireless LAN communication unit and the packet is transmitted to the access point using the retained access point information.

However, if a state where feeding of power to the wireless LAN communication unit is stopped lasts long, there is a possibility that the access point determines that the terminal has disappeared and discards association information. At this time, if the communication terminal starts feeding power to a wireless LAN interface to transmit a packet, the transmitted packet is discarded at the access point. Then, after a predetermined period of time, the communication terminal retransmits the packet for a predetermine number of times. In this way, the communication terminal fails to realize that the access point has discarded the association, and there exists a problem in that duration in which a packet cannot be transmitted increases.

In this way, there has been an issue in that if feeding of power to the wireless LAN communication unit is stopped for a power saving state, a delay until transmission of a packet becomes possible is large and thus the convenience for a user is lost.

DETAILED DESCRIPTION

According to some embodiments, there is provided a communication terminal, comprising: a communication device, a communication managing unit and a device power managing unit.

The communication device forms an association with communication equipment and communicates with the communication equipment based on the association.

The communication managing unit decides an operational mode of the communication device.

The device power managing unit controls power state of the communication device in accordance with an operational mode decided by the communication managing unit.

The device power managing unit sets, when a first operational mode is decided by the communication managing unit, the communication device in a first power state where transmission is not allowed and then transitions a power state of the communication device from the first power state to a second power state at a first cycle temporarily where transmission is allowed.

The communication device transmits a presence notification frame when set in the second power state.

Hereinafter, the present embodiment will be described with reference to the drawings.

Figure 1:
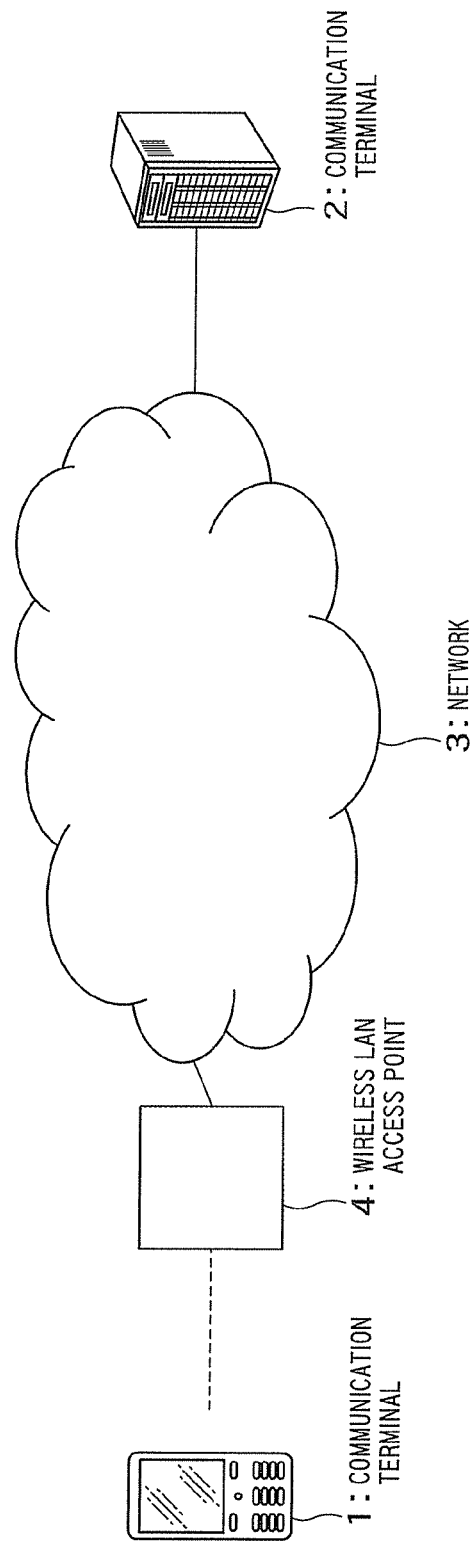
FIG. 1 shows an overall configuration in the present embodiment.

FIG. 1 shows an overall configuration in the present embodiment.

A communication terminal 1 and a communication terminal 2 are connected to each other through a network 3. The communication terminal 1 is connected to the network 3 through a wireless LAN access point 4 that is communication equipment via a wireless LAN (for example, IEEE 802.11). The communication network 2 is connected to the network 3 via 10 GB Ethernet. The wireless LAN access point 4 functions as relay equipment that relays communication.

A Web browser is executed at the communication terminal 1, and an HTTP server is in operation at the communication terminal 2. A mail service that uses HTTP is provided at the communication terminal 2, and this mail service is used from the communication terminal 1.

Figure 7:
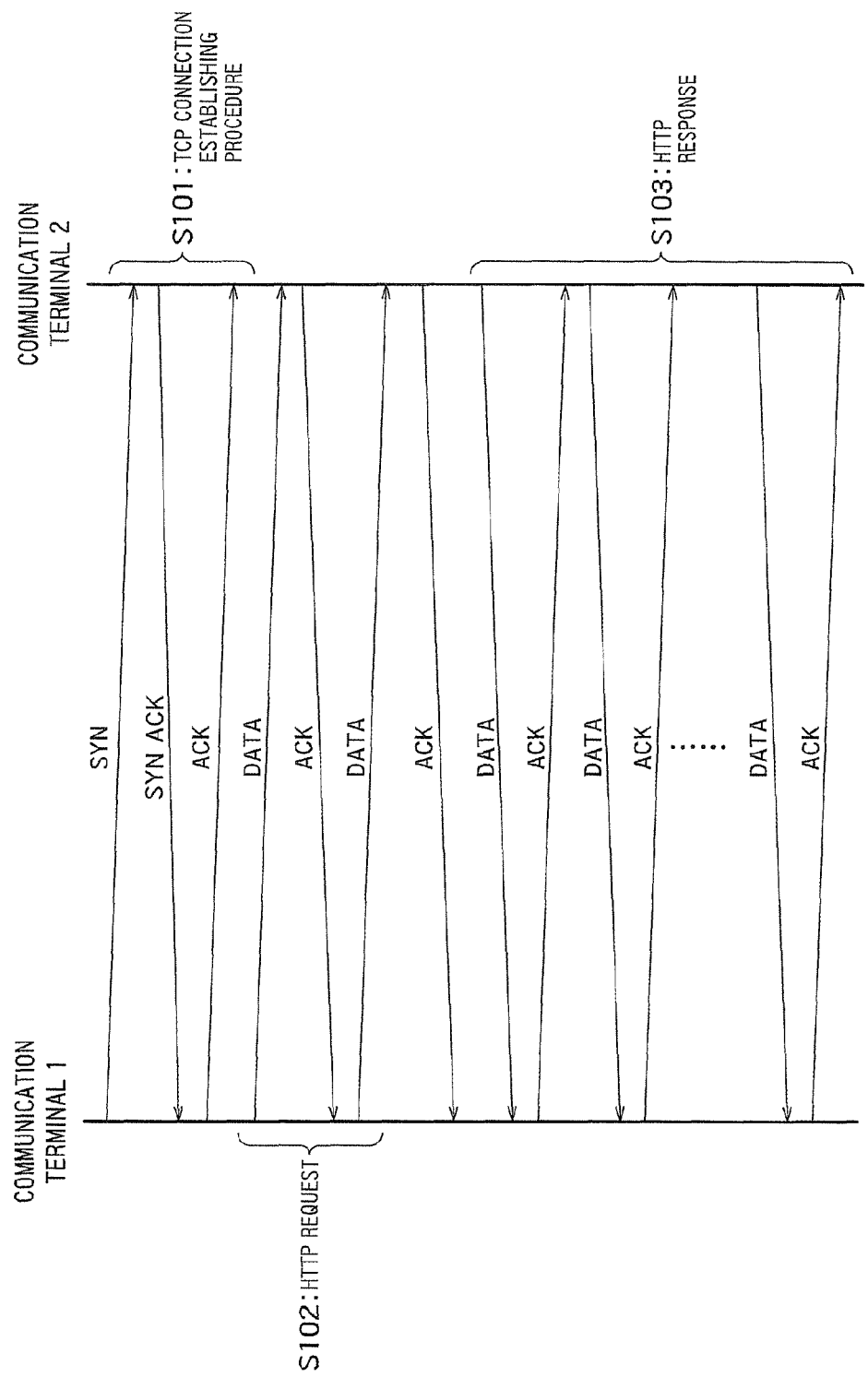
FIG. 7 shows an example of communication sequence between the communication terminal according to the present embodiment and a communication terminal on a network.

FIG. 7 shows an example of communication sequence between the communication terminal 1 and the communication terminal 2. In FIG. 7, sequence of a TCP packet is shown.

First of all, the communication terminal 1 establishes a TCP connection to the communication terminal 2 via an address port number 80 (S101). A TCP connection establishing procedure at this time is as follows. (1) An "SYN" packet of TCP is transmitted from the communication terminal 1 to the communication terminal 2, (2) the communication terminal 2 that has received this "SYN" packet transmits an "SYN ACK" packet to the communication terminal 1, and (3) the communication terminal 1 that has received this "SYN ACK" packet transmits an "ACK" packet to the communication terminal 2.

Next, the communication terminal 1 transmits an HTTP request to the communication terminal 2 (S102). At this time, the HTTP request is divided into a plurality of TCP packets in some cases. The communication terminal 2 that has received the HTTP request transmits an HTTP response to the communication terminal 1 (S103). The HTTP response is divided into a plurality of TCP packets in some cases. The "ACK" in FIG. 7 is a delivery confirming packet that indicates that "DATA" has been received and has information (a confirmation response number) on a segment size to identify received data.

Figure 8:
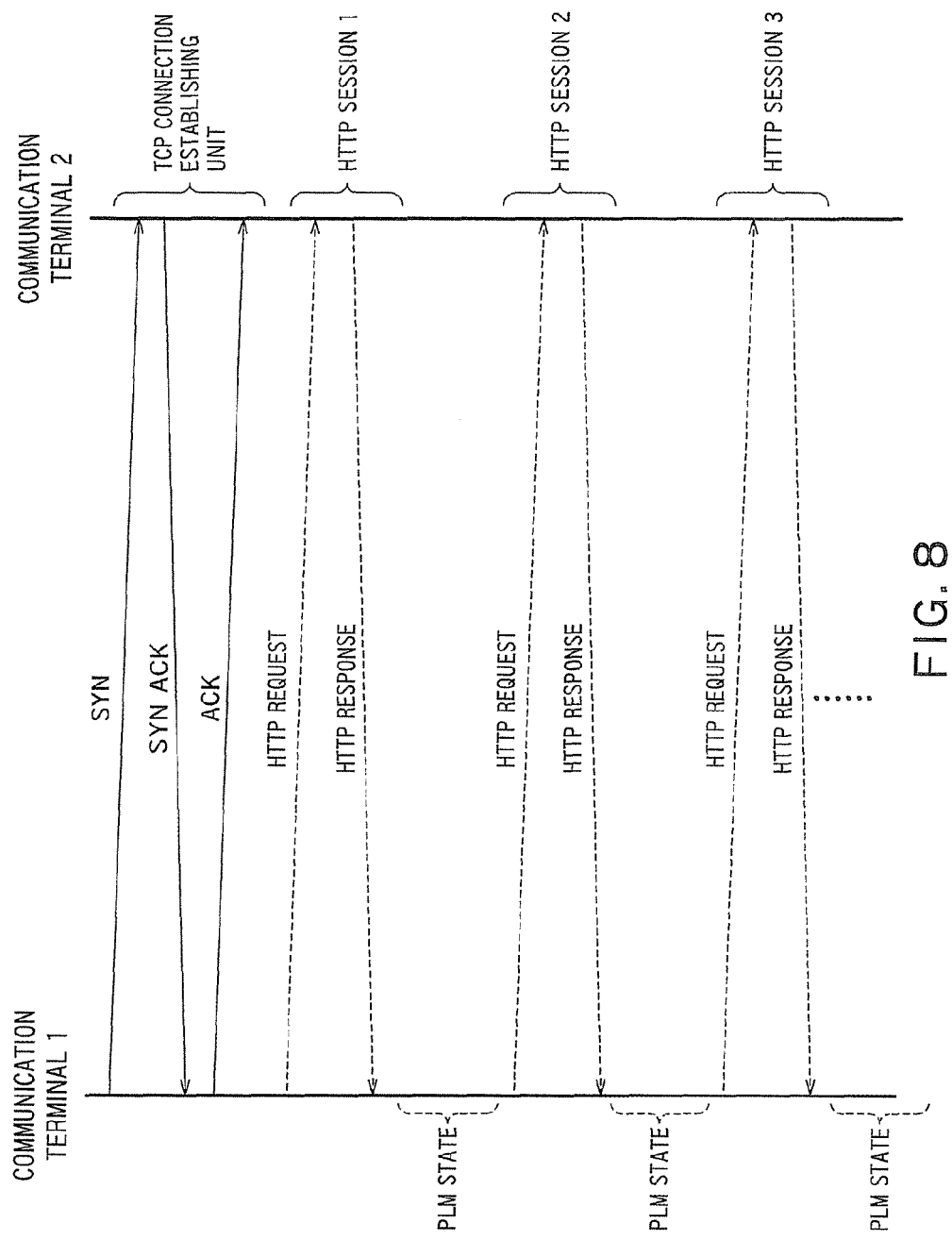
FIG. 8 shows the communication sequence at an HTTP level.

FIG. 8 shows communication sequence at an HTTP level. In FIG. 8, solid arrows indicate transmission and reception of a TCP packet, and dotted arrows indicate transmission and reception of information at the HTTP level.

As mentioned above, each of the HTTP request and the HTTP response is carried via one or more TCP packet(s). Typically, in an HTTP response of a first HTTP session 1, the communication terminal 1 receives HTML data that correspond to a user authentication screen. The HTML data that has been received via a Web browser that operates on the communication terminal 1 are shown to a user as a user ID and password input screen.

As the user inputs a user ID and a password in this screen and presses a transmit button, an HTTP session 2 is started. An HTTP request in the HTTP session 2 includes the user ID, the password, and a request URL (a URL requested by the HTTP request). The communication terminal 2 that has received this transmits, to the communication terminal 1, an HTTP response that includes HTML data for displaying a list of received mail of a corresponding user and user identification information to identify the user.

Further, as the user selects a certain mail on a received mail list screen, an HTTP session 3 is started. An HTTP request in the HTTP session 3 includes the user identification information to identify the user, mail identification information that corresponds to the mail which the user has selected, and the request URL. The communication terminal 2 that has received this transmits, to the communication terminal 1, an HTTP response that includes the user identification information and HTML data for displaying the mail that corresponds to the mail identification information.

Figure 9:
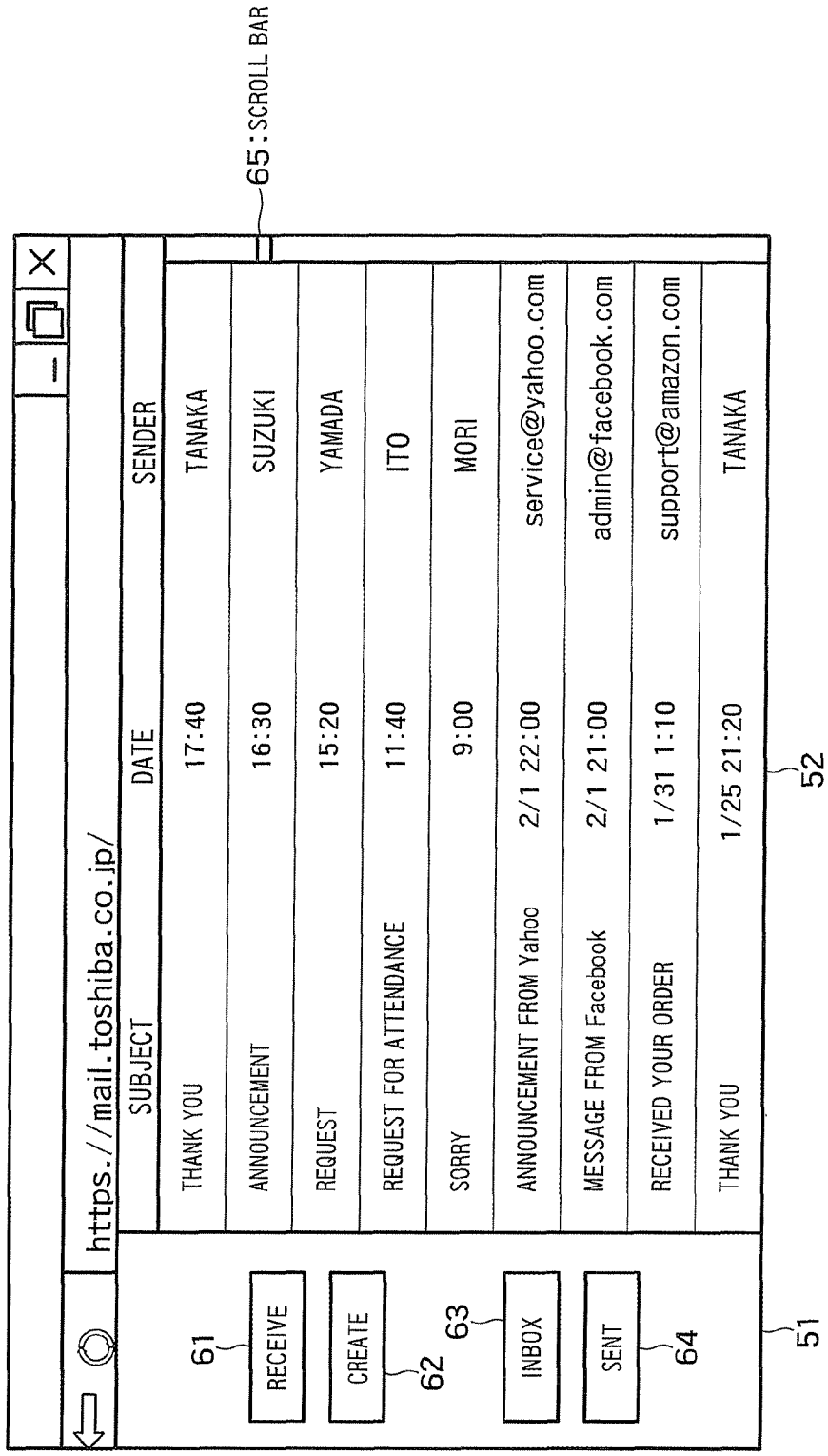
FIG. 9 shows an example of a received mail list screen.

FIG. 9 shows an example of the received mail list screen.

Upon receiving the HTML data that is included in the HTTP response in the HTTP session 2, the communication terminal 1 displays this on a screen using a Web browser. FIG. 9 is a display example thereof.

In this display example, the screen includes two frames. A receive button 61, a create button 62, an inbox button 63, and a sent button 64 are displayed in a left frame 51. Entries of (a subject, a received date, and a sender) that correspond to each of received mail are displayed in a right frame 52. Scrolling through the screen using a scroll bar 65 in the right frame makes it possible to display entries that do not fit within the screen.

Here, in order to display a screen with two frames as in FIG. 9, it is typical to acquire HTML data through a plurality of HTTP sessions, and not through a single HTTP session as described in FIG. 8. However, in FIG. 8, in order to facilitate the description, the description is given based on an example where HTML data for a received mail list screen can be received through a single HTTP session.

For example, in the case of the screen in FIG. 9, first HTML data is acquired first, and two frames and URLs of embedded objects that correspond to the respective frames are indicated in the HTML data. The Web browser receives the HTML data (the embedded objects) for the right screen and the left screen in FIG. 9 through two HTTP sessions for the URLs of the embedded objects. Of course, the embedded object can be a variety of data such as image data, aside from the HTML data.

When the user selects an uppermost entry on the received mail list screen in FIG. 9, the communication terminal 1 receives HTML data via the HTTP session 3. A display example of a screen to be displayed with the HTML data is shown in FIG. 10.

Figure 10:
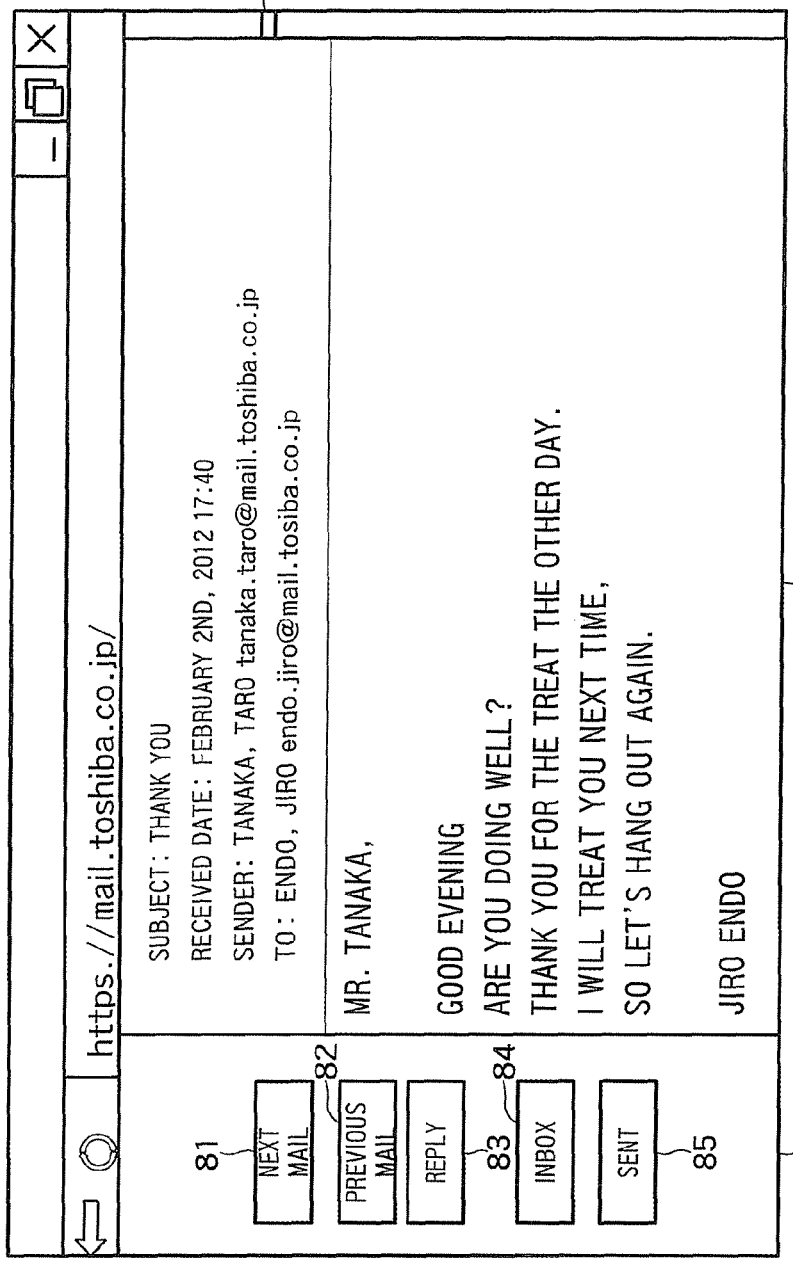
FIG. 10 shows a display example of a screen displayed through HTML data.

In the display example in FIG. 10, the screen includes two frames. A next mail button 81, a previous mail button 82, a reply button 83, an inbox button 84, and a sent button 85 are displayed in a left frame 71. Details of mail that corresponds to the mail which the user has selected are shown in a right frame 72. When a mail text is long and does not fit within the screen, scrolling through the screen using a scroll bar 86 in the right frame allows a portion outside the screen to be displayed.

While the user is reading the mail text in FIG. 10, communication between the communication terminal 1 and the communication terminal 2 does not occur. Since the screen data have all been acquired, even if the scroll bar is operated, for example, communication is not necessary. Thus, while the user is reading the mail (for example, for three minutes), it is possible to stop feeding power to the communication unit of the communication terminal 1 (a PLM state after the HTTP session 3 in FIG. 8). The PLM state is a state where feeding of power to the communication unit is stopped. In this way, by putting in the PLM state while communication does not occur, operating power and leakage power in a communication circuit can be reduced, and power consumption of the communication terminal 1 can be reduced. Further, the communication terminal 1 can be put in the PLM state, not only while the user is reading the mail, but also while the user inputs a user ID and a password in an authentication screen (between the HTTP session 1 and the HTTP session 2) and while the user is searching for a mail to read in the received mail list screen (between the HTTP session 2 and the HTTP session 3). This situation is shown in FIG. 8.

Figure 4:
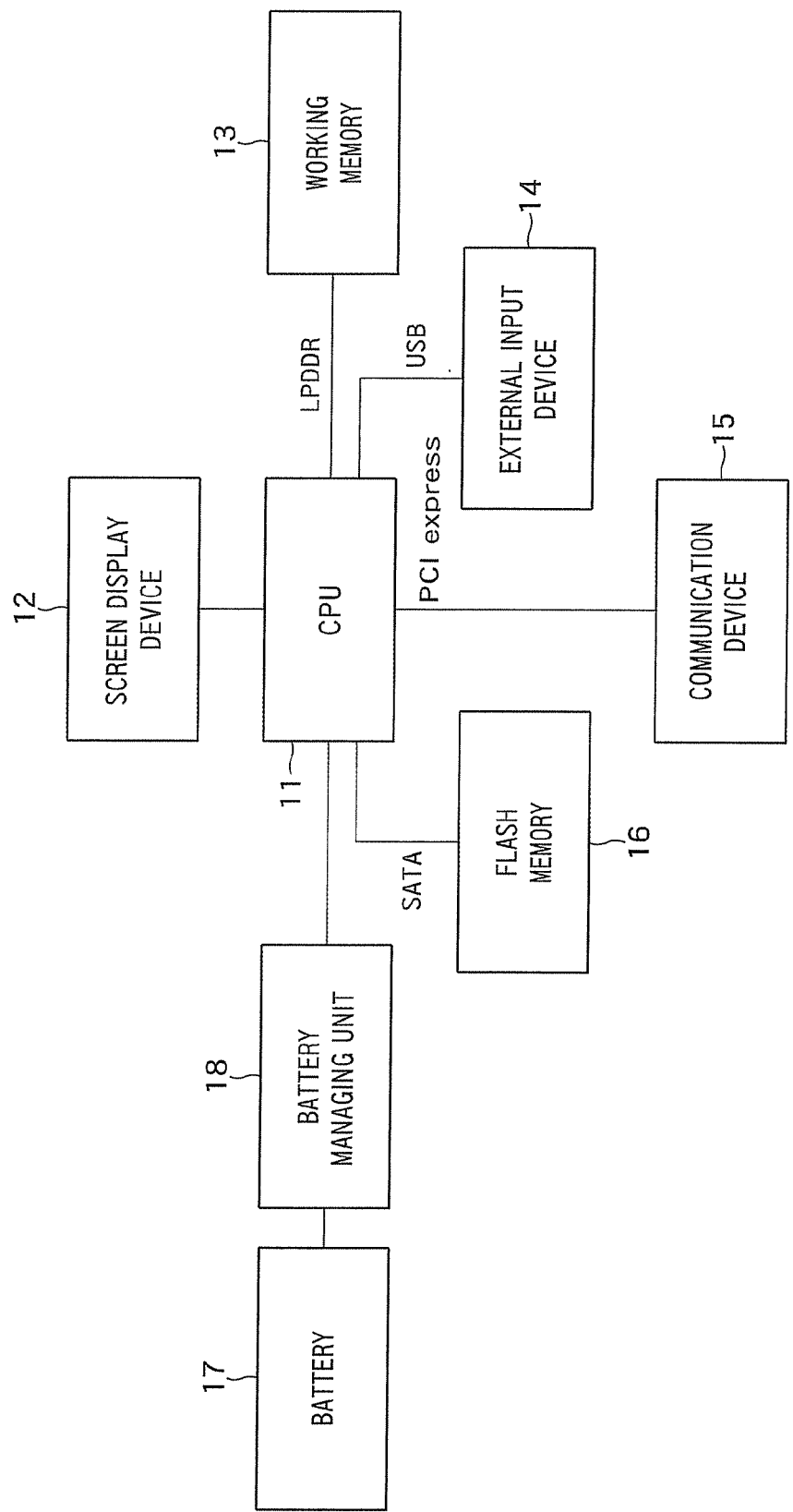
FIG. 4 shows a hardware configuration example of a communication terminal according to the present embodiment.

FIG. 4 shows a hardware configuration example of the communication terminal 1.

The communication terminal 1 includes a CPU 11, a screen display device 12, a working memory 13, an external input device 14, a communication device 15, a flash memory 16, a battery 17, and a battery managing unit 18.

The CPU 11, for example, is a processor such as Core i5 of Intel Corporation.

The screen display device 12 displays on a screen a screen display signal in a format that is visible to a human being, for example, as in an LCD display.

The working memory 13 is a memory such as a DRAM and is connected to the CPU 11, for example, via an LPDDR interface.

The external input device 14 is an input device such as a button, a touch panel, a keyboard, and a mouse and is connected to the CPU 11, for example, via a USB interface.

The communication device 15, for example, operates in accordance with wireless LAN (IEEE 802.11) standards and carries out transmission and reception of a packet with a network. The communication device 15 is connected to the CPU 11, for example, via a PCI express bus.

The flash memory 16, for example, is a NAND flash memory 16 and stores an OS, programs such as a Web browser, and user data. The flash memory 16 is connected to the CPU 11, for example, via a SATA interface. The flash memory 16 can be substituted with other media such as a hard disc, as long as they can store data.

The battery 17 is a lithium-ion battery or the like that supplies electrical energy to the communication terminal 1.

The battery managing unit 18 provides the CPU 11 with a battery state such as a remaining battery level.

Figure 11:
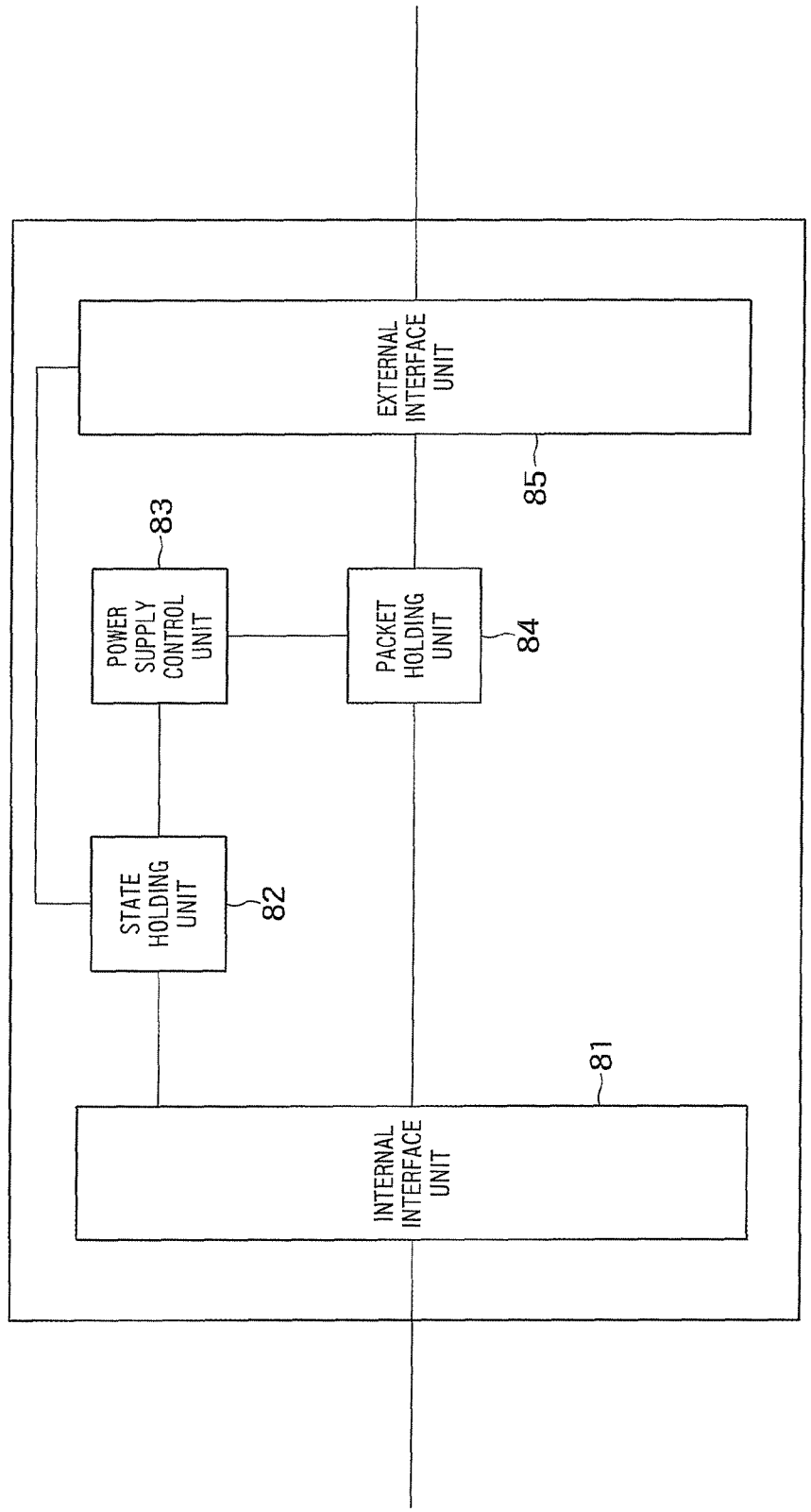
FIG. 11 shows a hardware configuration example of a communication device.

FIG. 11 shows a hardware configuration example of the communication device 15. The communication device 15 includes an internal interface unit 81, a state holding unit 82, a power supply state control unit 83, a packet holding unit 84, and an external interface unit 85.

The internal interface unit 81, for example, is a PCI-express interface and carries out information transmission and reception with the CPU 11 in accordance with PCI-express standards. In addition, feeding of power to the communication device 15 is carried out through the internal interface unit 81.

The external interface unit 85 includes a communication unit that transmits and receives a signal to and from a communication channel. In a case where a transmitting frame is present in the packet holding unit 84, the external interface unit 85 transmits this to the communication channel as an electrical signal or a radio signal. In addition, the external interface unit 85 receives an electrical signal or a radio signal from the communication channel and transmits this to the packet holding unit 84 as a receiving frame.

In a case of a wireless LAN, the external interface unit 85 includes a MAC processing unit and a physical layer processing unit of IEEE 802.11. The MAC processing unit transmits a probe request through the physical layer processing unit and receives a probe response from an access point to find the access point. The MAC processing unit repeats probe request transmission and probe response reception while changing a wireless channel to specify in the physical layer processing unit, to thereby be capable of finding an access point across various wireless channels.

The MAC processing unit notifies the CPU 11 of the found access point through the internal interface unit 81. The MAC processing unit receives, from the CPU 11, a connection request that includes an SSID, a BSSID, and a wireless channel of the access point through the internal interface unit 81. The MAC processing unit transmits an association request to the access point through the physical layer processing unit and the state holding unit 82 using the specified SSID, BSSID, and wireless channel and receives an association response. With this transmission and reception of the association request and the association response, an association is established between the communication device 15 and the access point. When the association is established, the MAC processing unit sends the SSID, the BSSID, and the wireless channel to the state holding unit 82. The state holding unit 82 holds thereinside these data received from the MAC processing unit.

When a transmitting Ether frame is present in the packet holding unit 84, the MAC processing unit adds a MAC header thereto to generate an IEEE 802.11 frame. The MAC processing unit transmits this frame to the access point through the physical layer processing unit. In addition, upon receiving an IEEE 802.11 frame from the access point through the physical layer processing unit, the MAC processing unit removes a MAC header thereof to extract an Ether frame. The MAC processing unit sends this Ether frame to the packet holding unit 84. The packet holding unit 84 temporarily holds the Ether frame received from the MAC processing unit.

The packet holding unit 84 receives a transmitting packet (an Ether frame in a case of a wireless LAN) from the working memory 13 through the CPU 11 and the internal interface unit 81 and holds it. The external interface unit 85 takes this out from the packet holding unit 84 and transmits to a communication channel. In addition, upon receiving a packet from the communication channel through the external interface unit 85, the packet holding unit 84 holds this and sends to the working memory 13 through the internal interface unit 81 and the CPU 11. In this way, the packet holding unit 84 temporarily stores a packet when a packet is exchanged between the working memory 13 and the communication channel and is used primarily to time an internal protocol and an external protocol.

The state holding unit 82 is a memory region that can be accessed from the CPU 11 and holds, for example, a plurality of register variables. As setting information of the communication device 15 is set in the state holding unit 82 from the CPU 11, a setting of the communication device 15 can be changed. In addition, the state holding unit 82 is also used to inquire of the external interface unit 85 information that pertains to a communication state. Hereinafter, examples of the register variables are shown.

| Register Names | Register Address | Size | Meaning |
|---|---|---|---|
| A | 0xFFFFFFFF | 32 Bits | Power Supply State of Communication Device (D0, D1, D2, D3) |
| B | 0xFFFFFFFE | 32 Bits | State of Communication Link (Up or Down) |
| C | 0xFFFFFFFD | 32 Bits | Number of Transmitting Packets in Packet Holding Unit |
| D | 0xFFFFFFFC | 32 Bits | Number of Receiving Packets in Packet Holding Unit |
| E | 0xFFFFFFFB | 32 Bits | State of Association (Present or Absent) |
| F | 0xFFFFFFFA | 48 Bits | BSSID of Access Point for Association |
| G | 0xFFFFFFF8 | 34 * 8 Bits | SSID of Access Point for Association |
| H | 0xFFFFFFEF | 32 Bits | Beacon Period of Access Point for Association |
| I | 0xFFFFFFEE | 32 Bits | DTIM Period of Access Point for Association |
| J | 0xFFFFFFED | 32 Bits | Used Wireless Channel |
| K | 0xFFFFFFEC | 32 Bits | Power Save Mode |
| L | 0xFFFFFFEB | 32 Bits | Transmitting Radio Field Intensity |
| M | 0xFFFFFFEA | 32 Bits | Transmitting Transfer Rate |
| O | 0xFFFFFFE9 | 36 * 8 Bits | Scan Request |
| P | 0xFFFFFFE0 | 36 * 16 * 8 Bits | Scan Result |
| R | 0xFFFFFE00 | 36 * 8 Bits | Association Request |

The power supply state control unit 83 sets a power supply state of the communication device 15 in accordance with a value of an "A" register of the state holding unit 82. In a case where the value of the "A" register is "0," it is set to a "D0" state, in a case of "1," it is set to a "D1" state, in a case of "2," it is set to a "D2" state, and in a case of "3," it is set to a "D3" state.

The "D0" state is a state where the communication device 15 is in operation, transmission and reception are allowed.

The "D3" state is a state where feeding of power is completely stopped except for a function that is required at the least to return to the "D0" state. In the "D3" state, both transmission and reception is disallowed or restricted. As a specific example, feeding of power to the external interface unit 85 and the packet holding unit 84 is stopped. The state holding unit 82 brings to a state where held content in all the registers is held while reading and writing other than in the "A" register are stopped. The internal interface unit 81 stops functions other than reading and writing in the "A" register.

The "D1" and the "D2" are states in between the "D0" and the "D3," and when P(Di) is taken as consumed power in each state, P(D0)>P(D1)>P(D2)>P(D3) is met. In addition, when time required to return to the "D0" from each state is expressed as T(Di), T(D1)<T(D2)<T(D3) is met.

In addition, an "E" register shows presence or absence of an association between the communication device and an access point. For example, if the value is "0," it means that there is no association, and if the value is "1," it means that there is an association.

In addition, in a case where there is an association with an access point, an "F" register holds a BSSID of that access point.

In addition, in a case where there is an association with an access point, a "G" register holds an SSID of that access point.

In addition, in a case where there is an association with an access point, an "H" register holds a beacon period of that access point.

In addition, in a case where there is an association with an access point, an "I" register holds a DTIM period of that access point.

Figure 6:
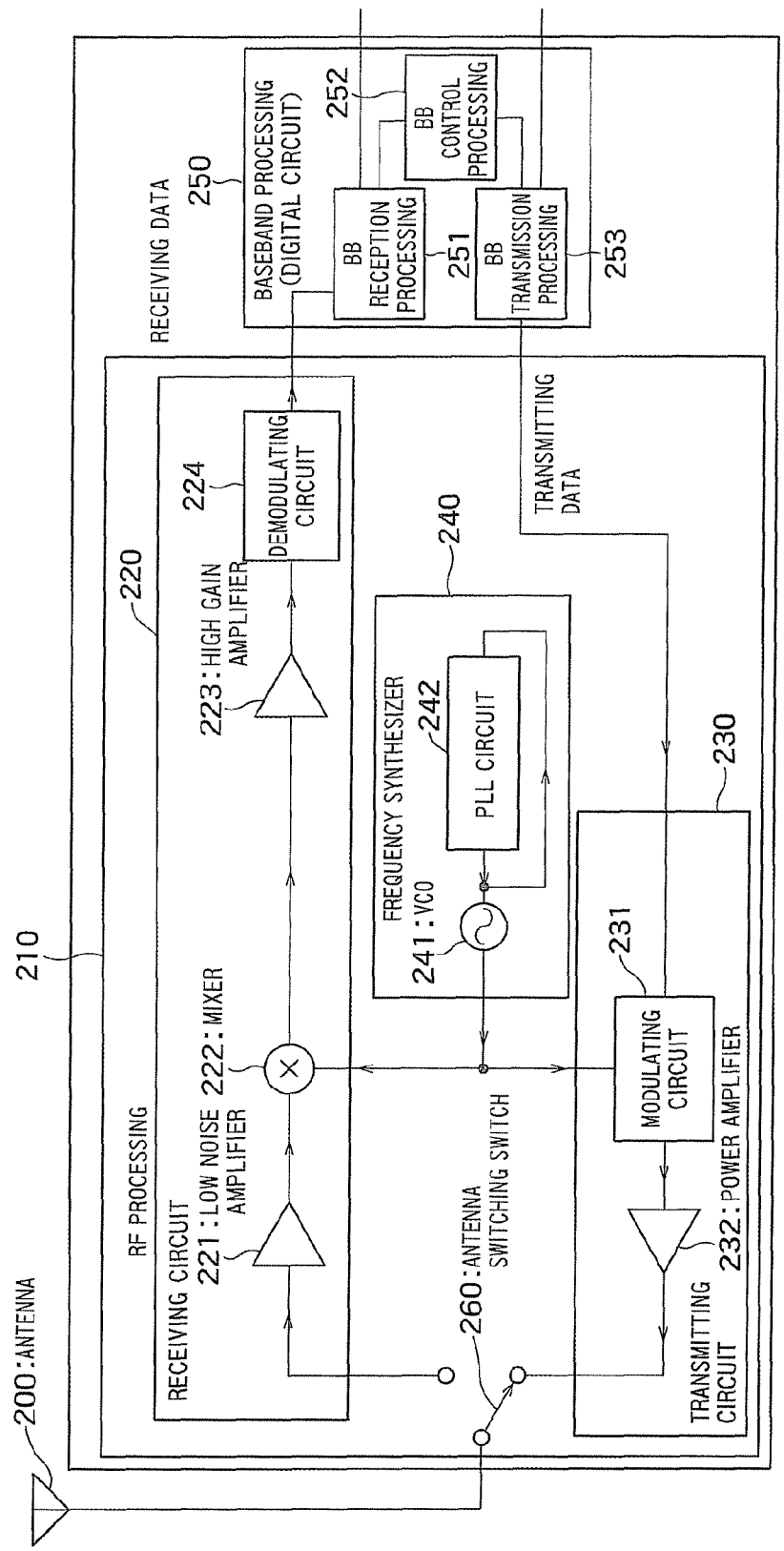
FIG. 6 shows a configuration of the external interface unit.

FIG. 6 shows a configuration of the external interface unit 85. The external interface unit 85 includes an antenna 200, an RF (Radio Frequency) processing unit 210, and a baseband processing unit 250.

The antenna 200 carries out transmission and reception of a radio signal. In FIG. 6, there is one antenna 200, and this one antenna is commonly used for transmission and reception by using an antenna switching switch 260. As a configuration aside from this, it is possible to use a plurality of antennas as in a method called MIMO. Alternatively, it is possible to use distinct antennas for transmission and reception.

The RF processing unit 210 carries out a conversion between a digital signal and an electrical signal that is to be transmitted and received as an electric wave. The RF processing unit 210 includes a receiving circuit 220, a transmitting circuit 230, and a frequency synthesizer 240.

The frequency synthesizer 240 is a transmitter that includes a PLL circuit 242 and a VCO 241 and carries out a frequency conversion.

The receiving circuit 220 demodulates a signal received from the antenna and sends a demodulated signal to the baseband processing unit 250. The receiving circuit 220 includes a low noise amplifier 221, a mixer 222, a high gain amplifier 223, and a demodulating circuit 224. An electrical signal received from the antenna 200 is amplified by the low noise amplifier 221, converted into an intermediate frequency by the mixer 222 next, and amplified by the high gain amplifier 223, and thereafter demodulating processing is carried out.

The transmitting circuit 230 converts a digital signal received from the baseband processing unit 250 into an electrical signal and sends to the antenna 200. The transmitting circuit 230 includes a modulating circuit 231 and a power amplifier 232. The digital signal received from the baseband processing unit 250 is processed in the modulating circuit 231, to thereby become a modulated signal. This modulated signal is amplified in the power amplifier 232 and thereafter transmitted to the antenna 200.

The baseband processing unit 250 carries out IEEE 802.11 MAC processing and includes a BB reception processing unit 251, a BB transmission processing unit 253, and a BB control processing unit 252.

The BB reception processing unit 251 carries out receiving processing of a frame. The BB receiving processing unit 251 checks a frame format at a time of receiving the frame and, in a case where the received frame is a data frame, extracts an Ether frame included therein to send to the packet holding unit (FIG. 11). In a case where the received frame is a control frame, it is sent to the BB control processing unit 252.

The BB transmission processing unit 253 carries out transmitting processing of a frame. Upon receiving a transmitting Ether frame from the packet holding unit 84, the BB transmission processing unit 253 generates a MAC frame and sends to the RF processing unit 210. Retransmitting processing of the MAC frame is also carried out here.

The BB control processing unit 252 carries out processing of a control frame of IEEE 802.11 and carries out processing of a received beacon, generation of an association request, and processing of a received association response. In a case where a "NULL" frame is to be transmitted as a presence notification message, generation of this frame is carried out by the BB control processing unit 252.

As will be described later, in a state called PLM, the external interface unit 85 has three PLM operation states of a transmission and reception disallowed state, a reception allowed state, and a transmission and reception allowed state.

The transmission and reception disallowed state is a state where feeding of power to the RF processing unit 210 and the baseband processing unit of the external interface unit 85 is stopped. Here, in stopping feeding of power, it is desirable to stop feeding power to all circuits except for a timer (not shown) or the like, but in order to carry out a transition into the PLM operation state at a high speed, power may be fed to a circuit (for example, the PLL circuit 242 and the like) that requires long time to come into being operable after power feeding. In addition, a low voltage may continue to be applied to some circuits without completely bringing a voltage to zero.

The reception allowed state is a state where power is fed only to a circuit that is necessary for reception and, for example, is a state where power is fed to processing units other than the transmitting circuit 230 of the RF processing unit 210 and the BB transmission processing unit 253 of the baseband processing unit 250. In this state, receiving processing of a radio signal is possible, but transmitting processing cannot be carried out.

The transmission and reception allowed state is a state where transmission and reception are allowed and is a normal operation state. That is, a power is fed to all the blocks in the external interface unit 85. However, in order to reduce power consumption, feeding of power to some functions may be stopped, and those functions may be made unusable. In order to reduce power consumption, a communication speed may be reduced.

Note that, aside from the above, a transmission allowed state where reception processing cannot be carried out but transmission processing is allowed may be defined.

In general, power consumption in the power amplifier of the RF processing unit is large. In addition, even when transmission and reception are not carried out, if power feeding is carried out, all the circuits consume power. Accordingly, as feeding of power to some circuits is stopped as described above, power consumption can be reduced.

(Scan Operation)

When a scan request (a scan type, a channel, and an SSID) is written in an "O" register through the internal interface unit 81, the external interface unit 85 carries out a scan operation. The scan type indicates either of an active scan or a passive scan. The channel indicates a wireless channel to be scanned. The SSID is valid only in the case of the active scan.

In the active scan, the external interface unit 85 transmits, to a communication channel, a probe request frame in which a specified SSID is indicated, and an access point that has the specified SSID transmits a probe response frame to this probe request frame. Upon receiving this probe response frame, the external interface unit 85 extracts (a BSSID, an SSID, a beacon period, a supported transmission transfer rate, and encryption information (Capability Information)) included therein and a receiving electric field intensity of the probe response frame and writes in a "P" register. Here, in a case where probe responses are received from a plurality of access points, the aforementioned information is written in the "P" register for each access point. In addition, in a case where the SSID written in the "O" register is "NULL," the external interface unit 85 transmits a probe request frame with a value of "SSID=0." An access point that has received this transmits a probe response frame regardless of the value of the SSID which the access point has.

In the passive scan, the aforementioned value is extracted from beacons that have been received in a period defined with respect to a channel specified by the "O" register and written in the "P" register. In the case of the passive scan as well, when beacons are received from a plurality of access points, information on the plurality of access points is written in the "P" register.

(Association Operation)

When an association request (a CH, an SSID, and a BSSID) is set in an "R" register through the internal interface unit 81, the external interface unit 85 transmits an association request frame to a transfer channel using this value. When an association response frame is received from an access point that has the SSID and the BSSID, an association is established between the communication device and the access point. In addition, by exchanging an authentication request frame and an authentication response frame as necessary, it is possible to encrypt the communication with the access point.

After the association is established, upon receiving, from a wired communication channel, a frame that has a MAC address of the external interface unit 85 as a destination address, the access point transmits this to a wireless transfer channel. In addition, upon receiving a frame that has the MAC address of the external interface unit 85 as a source address, the access point carries out reception processing thereof and forwards to a wired interface.

If the association is not established, even if the access point receives, from a wired communication channel, a packet that has the MAC address of the external interface unit 85 as a destination address, the access point discards this packet. In addition, even if the access point receives, from a wireless communication channel, a packet that has the MAC address of the external interface unit 85 as a source address, the access point discards this packet.

(Power Saving State)

A frame can be transmitted to and received from an access point when the communication device is in the "D0" state, but a frame cannot be transmitted or received when in the "D3" state. In a case where the communication device is in the "D0" state, the external interface unit 85 carries out a different operation depending on a value of a "K" register.

When the value of the "K" register is 0, the external interface unit 85 is in a state (Normal) where a frame can be transmitted and received at any time.

When the value of the "K" register is 1, the external interface unit 85 carries out a power save mode (PSM) defined by the IEEE 802.11 specifications. In this PSM, when the packet holding unit receives a transmitting packet through the internal interface unit 81, the external interface unit 85 immediately transmits this packet to a wireless communication channel. As for the receiving operation, using a beacon period that has been received via an association response frame, the external interface unit 85 transitions into the reception allowed state at a beacon transmitting timing of the access point. Upon receiving a beacon, the external interface unit 85 refers to a TIM (Traffic Indication Map) included therein and confirms presence or absence of a frame addressed to itself. If the access point has a frame addressed to the external interface unit 85, it transmits, to the access point, a PS-Poll frame that requests transmission of that frame and receives the frame addressed to itself from the access point. In addition, since a multicast or broadcast frame is transmitted from the access point immediately after a beacon corresponding to the DTIM period is transmitted, the external interface unit 85 is in the reception allowed state at this timing. If the external interface unit 85 finds out that the access point does not have a frame addressed to itself by referring to the TIM, the external interface unit 85 transitions into the reception disallowed state to reduce power consumption.

Figure 2:
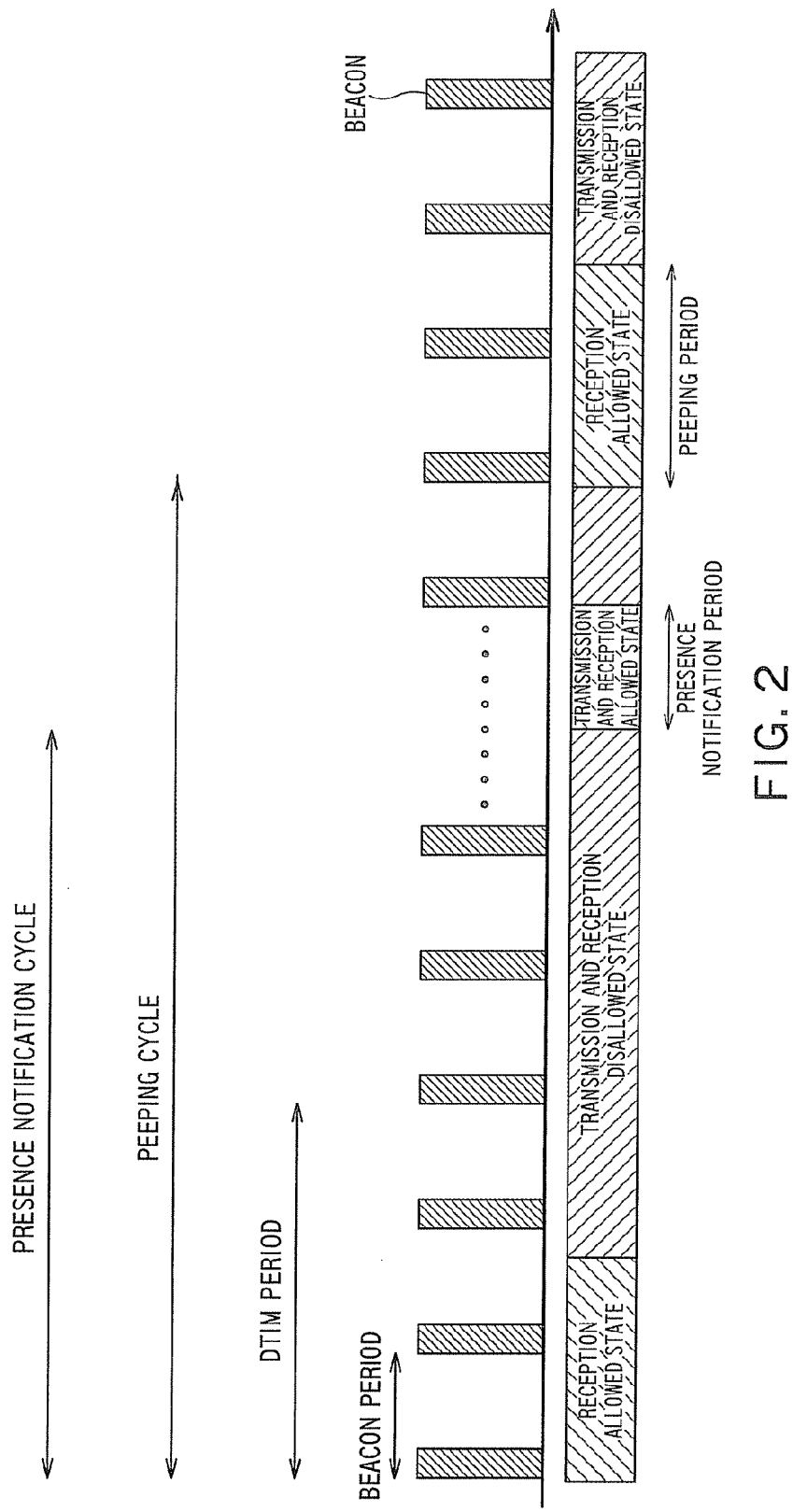
FIG. 2 shows an operation timing in a power limit mode.

When the value of the "K" register is 2 (proposing scheme), the external interface unit 85 transitions into a power limit mode (PLM) that corresponds to a first operational mode of the present embodiment. An operation timing in the PLM is shown in FIG. 2. In FIG. 2, the access point transmits a beacon for each beacon period.

The external interface unit 85 transitions into the transmission and reception allowed state at a predetermined peeping cycle (a second cycle) and transitions into the transmission and reception disallowed state after an end of a predetermined peeping period (a second period).

In addition, the external interface unit 85 transitions into the transmission and reception allowed state at a presence notification cycle (a first cycle) and transitions into the transmission and reception disallowed state after an end of a presence notification period (a first period).

In the transmission and reception disallowed state, feeding of power to an electrical circuit of the external interface unit 85 is stopped, and power consumption is suppressed. At this time, it is desirable to stop a clock delivery to a circuit by stopping all PLL (Phase Lock Loop) circuits. However, it is needless to say that a timer circuit remains in operation to return to the reception allowed state in a subsequent peeping period. In this example, although a transition into the transmission and reception allowed state is made at a peeping period, instead, it is possible to transition into the reception allowed state (transmission is not allowed). That is, during a peeping period, a transition is made into the transmission and reception allowed state in a case where an active scan is to be carried out, whereas in a case of transitioning into a passive scan, a transition is made into the reception allowed state or the transmission and reception allowed state. Hereinafter, a description will be given supposing that a transition into the reception allowed state is made.

Figure 3:
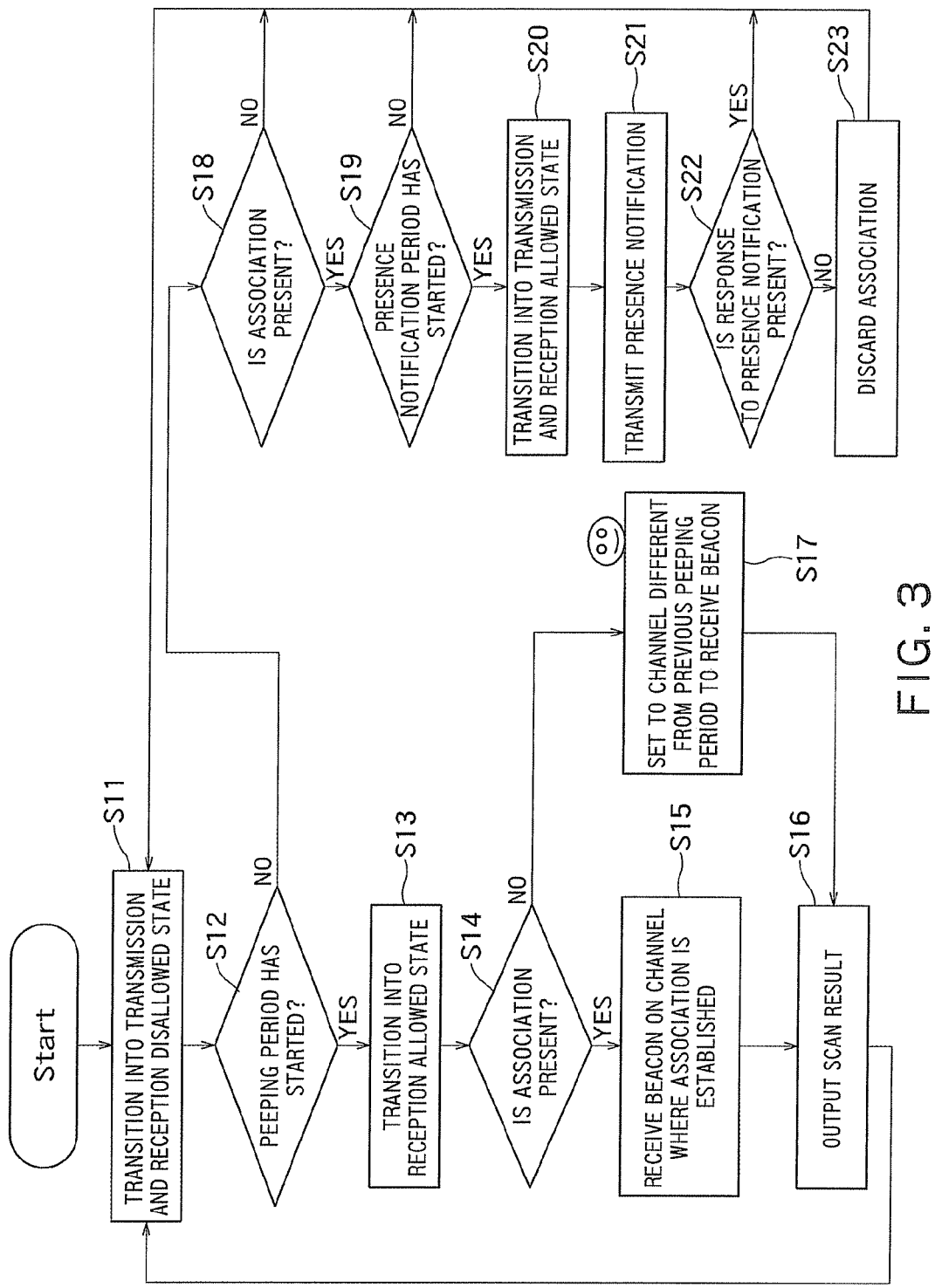
FIG. 3 shows an operation of an external interface unit in the power limit mode.

FIG. 3 shows an operation of the external interface unit 85 in the PLM. Upon transitioning into the PLM, the external interface unit 85 transitions into the transmission and reception disallowed state (S11). A timer is set to a length of a predetermined peeping cycle. Upon noticing a start of a peeping period with this timer (S12), the external interface unit 85 transitions into the reception allowed state (S13) and checks to see whether an association is established by referring to an "E" register (S14). In a case where an association is established, the external interface unit 85 refers to a "j" register and carries out a passive scan on a wireless channel (frequency) used for communication with the access point (S15). Then, a scan result is outputted to the "P" register (S16).

When there is no association, a passive scan is carried out at a distinct frequency for each peeping period (S17). For example, in a case where CH1 has been scanned in a previous peeping period, CH2 is scanned this time, and CH3 is scanned for the next time. This change in the channels can be realized through a variety of methods. For example, a channel to be scanned can be determined by a random number for each time a peeping period starts. Alternatively, a change width of the channels can be made to 1 or more as in CH1, CH4, CH7, CH10, CH13, CH2, CH5, . . . . Here, in Step S17 (a smiley face), in a case where a beacon is received from an access point with which an association can be established, an association with that access point may be established based on connection information (an SSID, a WEP key, and connection priority) set in advance.

Further, in a case where there is an association (YES in S18), whether or not a start of a presence notification period has arrived is checked with a timer that is set for a length of a presence notification cycle (S19). When the start arrives, a transition into the transmission and reception allowed state is made (S20), and a presence notification to notify of its own presence (the communication terminal 1) is transmitted (S21). Determination as to whether or not a response (IEEE 802.11 "ACK") to the presence notification has been received during that period is made (S22), and in a case where it has not been received, the value of the "E" register is changed to a state where there is no association (S23). That is, the association is discarded. On the other hand, in a case where a response to the presence notification has been received, a transition into the transmission and reception disallowed state is made (S11). In a case where a response to the presence notification is received, a transition into the transmission and reception disallowed state may be made immediately even during a presence notification period. By transmitting the presence notification, even if the communication terminal 1 transitions into the transmission and reception disallowed state, an association with the access point can be maintained.

Here, it is desirable that, in a case where there is no response to the presence notification, the presence notification is retransmitted a predetermined number of times, and in a case where there is not any response to the presence notification, the association is discarded. In addition, although it is desirable that a presence notification message is a "NULL" frame of IEEE 802.11, a variety of messages can be used as a presence notification message. A distinct message may be used as a presence notification message for each presence notification period to transmit an "ICMP ECHO Request" after a "NULL" frame.

Alternatively, it is possible that transmitting an "ARP Announcement" message (RFC 3972) serves as its own presence notification. In this case, it is possible not only to notify the access point of its own presence but also to update an ARP cache table of an identical subnet (not shown in FIG. 1) or a router. In addition, in a case where an L2 switch is present, it is possible to update an Ether frame forward table thereof. In a case where an "ARP Announcement" message is to be transmitted, the communication terminal 1 may not receive an ARP response thereto.

Note that although there are two periods of a peeping period and a presence notification period in the above description, a mode where a peeping period is not provided is also possible. In addition, although a transition into the transmission and reception allowed state is made in the presence notification period, in a case of a mode where a response frame to a presence notification frame is not received, a transition can also be made into the transmission allowed state where reception is not allowed.

Figure 5:
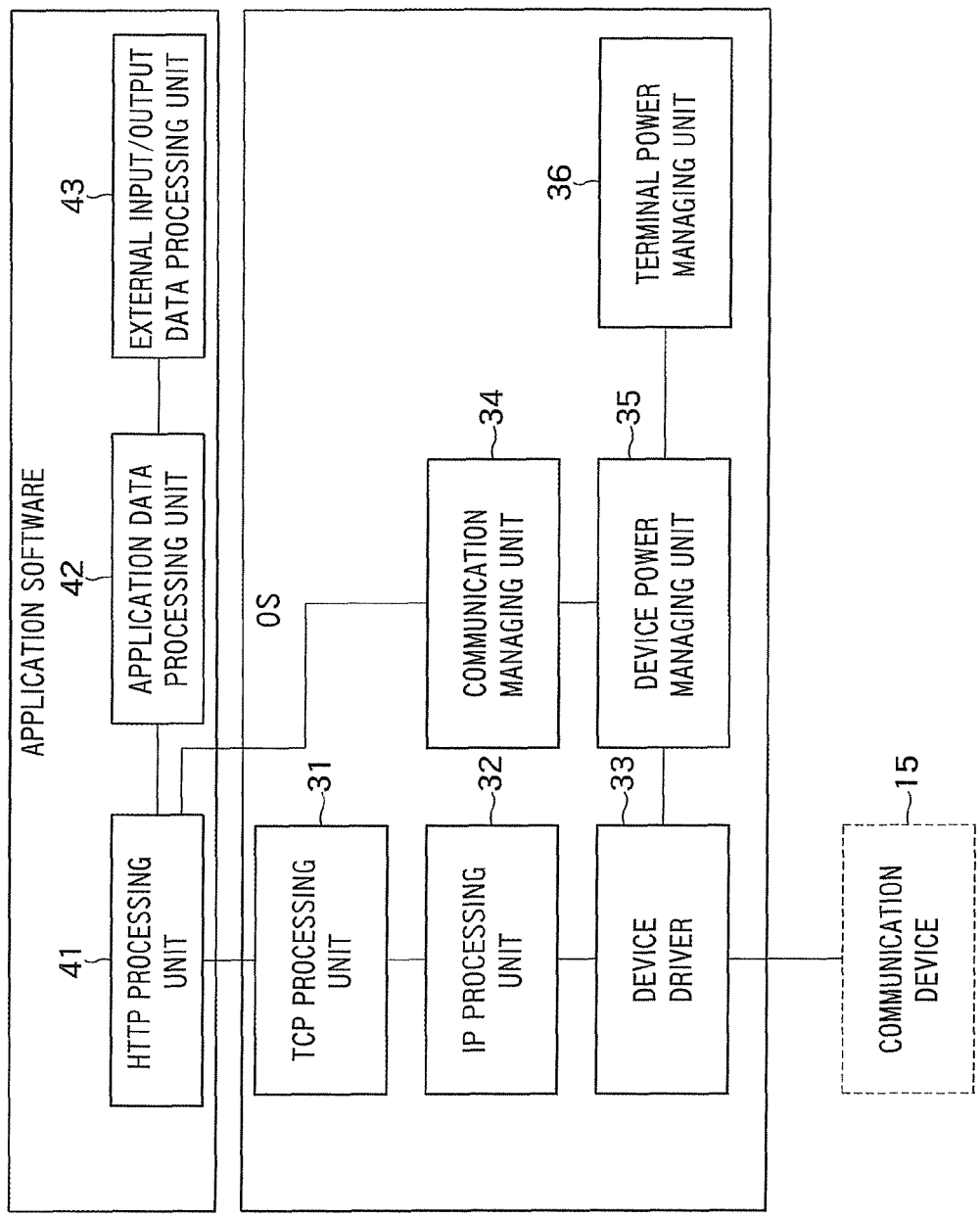
FIG. 5 shows a software configuration of the communication terminal according to the present embodiment.

FIG. 5 shows a software configuration of the communication terminal 1. The communication terminal 1 is realized as the software in FIG. 5 operates on the hardware in FIG. 4. Each block shown in FIG. 3 can be realized as a program module. A program may be stored in a computer-readable storage medium. The program is read out from the storage medium by a computer, expanded in a memory, and executed. However, part of the software in FIG. 5 can also be realized by hardware. The software in FIG. 5 can be largely divided into an OS and application software.

The OS includes a TCP processing unit 31 (a connection processing unit), an IP processing unit 32, a device driver 33, a communication managing unit 34, a device power managing unit 35, and a terminal power managing unit 36.

The TCP processing unit 31 establishes/releases a TCP connection by a request of the application software. In addition, the TCP processing unit 31 converts data handed from the application software into a TCP packet format to transmit to the communication terminal 2 through the IP processing unit 32 and the device driver 33. In a case where an "ACK"

packet is not received from the communication terminal 2, retransmitting processing of the TCP packet is carried out. Further, the TCP processing unit 31 transmits an "ACK" packet to the communication terminal 2 for the TCP packet that has been received from the communication terminal 2. In addition, the TCP processing unit 31 extracts data from the received TCP packet and sends to the application software. Note that, although a connection is established with the communication terminal 2 in the present embodiment, when the access point (communication equipment) 4 includes TCP/IP and an application, a connection can also be established with and release from the access point 4.

The IP processing unit 32 converts a TCP packet received from the TCP processing unit 31 into an IP packet to transmit to the communication terminal 2 through the device driver 33. Further, the IP processing unit 32 extracts a TCP packet from an IP packet received from the communication terminal 2 and sends to the TCP processing unit 31. Note that, although not shown in the drawing, an Ether processing unit is present between the IP processing unit 32 and the device driver 33. The Ether processing unit converts an IP packet received from the IP processing unit 32 into an Ether frame to send to the device driver 33. In addition, the Ether processing unit extracts an IP packet from an Ether frame received from the device driver 33 and hands to the IP processing unit 32.

The device driver 33 is software for controlling the communication device 15 in FIG. 4. The device driver 33 reads and writes data in a specified memory address, to thereby access a register of the communication device 15 and control the communication device 15 therethrough. Further, the device driver 33 sends an Ether frame received from the Ether processing unit to the communication device 15. In addition, in a case where the communication device 15 receives an Ether frame from a communication channel, the device driver 33 is executed as an interrupt is placed on the CPU 11 from the communication device 15, and the device driver 33 receives an Ether frame from the communication device 15. This exchange of an Ether frame between the communication device 15 and the device driver 33 is carried out by accessing a predetermined memory address. In the present embodiment, it is assumed that the CPU 11 of the communication terminal 1 accesses peripheral devices such as the communication device 15 and the working memory 13 using a memory mapped IO. However, it is possible to use other access methods such as a port mapped IO.

The communication managing unit 34 receives communication activity information (an HTTP session start notification and an HTTP session end notification) from an HTTP processing unit 41 of the application software. Upon receiving an HTTP session end notification, the communication managing unit 34 sends, to the device power managing unit 35, a power supply state setting request (PLM) of the communication device 15. In addition, upon receiving an HTTP session start notification, the communication managing unit 34 sends, to the device power managing unit 35, a power supply state setting request (PSM) or a power supply state setting request (Normal) of the communication device 15. Note that a "power supply state setting request (X)" is to request for the communication device to be put in an X mode. In this way, the communication managing unit 34 decides an operational mode of the communication device. It is also possible to decide an operational mode based on an instruction from a user. In addition, it is also possible to decide an operational mode in accordance with the establishment/release of a connection of the TCP processing unit 31. For example, when a connection is released, it is decided to be put in a first operational mode (a PLM mode). In addition, it is also possible to decide an operational mode in accordance with a start and an end of a session on a connection. For example, when an end is detected, it is decided to be put in the first operational mode (PLM). Note that a session can be not only an HTTP session but also a session of a given protocol formed on a connection.

The device power managing unit 35 accesses the "K" register in accordance with a received power supply state setting request, to thereby control a power supply state of the communication device 15. Note that although the device power managing unit 35 that corresponds only to the communication device 15 is provided in the present embodiment, it is also possible to provide power supply state managing units that correspond to all components such as the external input device 14, the working memory 13, the CPU 11, and a connecting interface (PCI-Express or the like) for the above. In this case, it is possible to manage a power supply state for each component.

The terminal power managing unit 36 manages power supply states of all components including the device power managing unit 35. The terminal power managing unit 36, for example, causes the entire communication terminal 1 to transition into a sleep state and to resume an operating state from the sleep state.

The application software includes the HTTP processing unit 41, an application data processing unit 42, and an external input/output data processing unit 43.

The application data processing unit 42 carries out, on application data received from the HTTP processing unit 41, processing that is specific to that application software. In a case of a Web browser, HTML data are received as the application data, and rendering processing (processing to generate a color of a pixel in a screen or a luminance value) is carried out using the data. Pixel data that have been generated in the rendering processing are sent to the external input/output data processing unit 43. Here, the application data can be a variety of data such as image data, dynamic image data, sound data, aside from the HTML data. The type thereof does not matter as long as they are data for rendering processing. In addition, the rendering processing includes any processing not only to generate the pixel data but also to generate data in a format in accordance with an output device in order to output the information to the outside. For example, the rendering processing includes a case where sound data are generated and a case where an LED or the like is controlled.

Further, the application data may be a program that is written in JavaScript. In that case, the application data processing unit 42 executes that program and carries out rendering processing in accordance with that result or requests a new HTTP communication from the HTTP processing unit 41. For example, Google docs by Google Incorporated is realized by a program written in JavaScript, and it operates as the program is executed in the application data processing unit 42. A program to be processed in the application data processing unit 42 does not need to be limited to ones written in JavaScript and can be written a variety of programming languages.

In a case where a need for acquiring new application data arises, the application data processing unit 42 transmits an HTTP communication request including an URL thereof. For example, such cases include a case where an embedded URL is written in the received application data or a case where necessity arises in a process of executing a program.

Further, when an external event is received from the external input/output data processing unit 43, generation of new pixel data corresponding to that or transmission of an HTTP communication request to the HTTP processing unit 41 is carried out. For example, upon receiving a mouse drag event of a scroll bar position in FIG. 10 through the external input/output data processing unit 43, the application data processing unit 42 generates pixel data that correspond to the screen scroll and sends to the external input/output data processing unit 43. Alternatively, upon receiving a mouse click event of the inbox button 84 in FIG. 10 through the external input/output data processing unit 43, the application data processing unit 42 sends, to the HTTP processing unit 41, an HTTP communication request that includes a URL for acquiring the received mail list screen in FIG. 9.

Upon receiving the pixel data from the application data processing unit 42, the external input/output data processing unit 43 displays a screen using them. For example, a screen display as shown in FIG. 10 is carried out. In addition, upon receiving an event from the outside such as a mouse click, the external interface unit 85 sends this to the application data processing unit 42.

Figure 12:
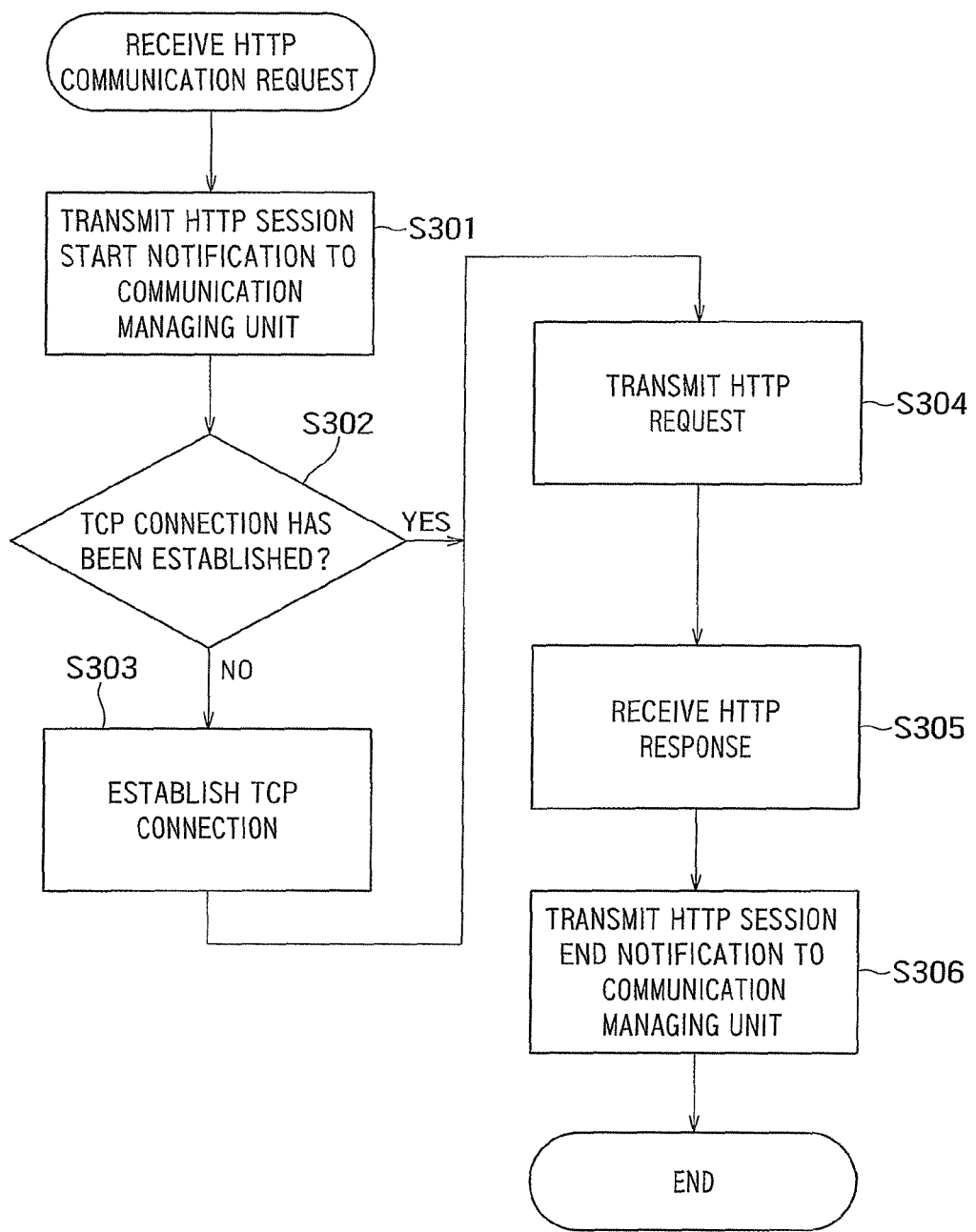
FIG. 12 shows an operation of an HTTP processing unit.

FIG. 12 shows an operation of the HTTP processing unit 41. Upon receiving an HTTP communication request from the application data processing unit 42, the HTTP processing unit 41 sends, to the communication managing unit 34, an HTTP session start notification (session identification information, process identification information, and connection identification information) (S301).

The session identification information is information for uniquely identifying an HTTP session in the application software, and presence of this information makes it possible to use a plurality of HTTP sessions in single application software. The process identification information is information for identifying a process of the application software (in a case of UNIX). As an HTTP session start notification has a pair of (the session identification information and the process identification information) in this way, it becomes possible to uniquely identify an HTTP session in the communication terminal 1.

Further, the connection identification information is information for identifying a TCP connection which an HTTP session uses, and a socket number that is returned by the OS on a "socket( )" system call can, for example, be used. However, when a TCP connection which that HTTP session uses has not been established, an invalid value such as 0 is set.

Subsequently, a designation address within the URL included in the HTTP communication request and presence/absence of establishment of a TCP connection with respect to a port number are confirmed (S302), and in a case where a TCP connection is not established, a TCP connection is established (S303).

Subsequently, an HTTP request is transmitted using the TCP connection (S304), and an HTTP response thereto is received (S305). When an HTTP response is received, an HTTP session end notification (the session identification information, the process identification information, and the connection identification information) is sent to the communication managing unit 34 (S306). At this time, in the connection identification information of the HTTP session end notification, information such as a socket number for identifying a TCP connection used for the HTTP session is indicated.

(Screen Display)

As described above, in the present embodiment, it is possible to maintain an association even in the PLM state where power consumption is small, and further, it is possible to detect a disconnection of the association. Further, it is possible to scan all the CHs in a state where there is no association. Thus, displaying a screen in accordance with these states makes it possible to let a user know whether or not communication is possible.

Figure 13:
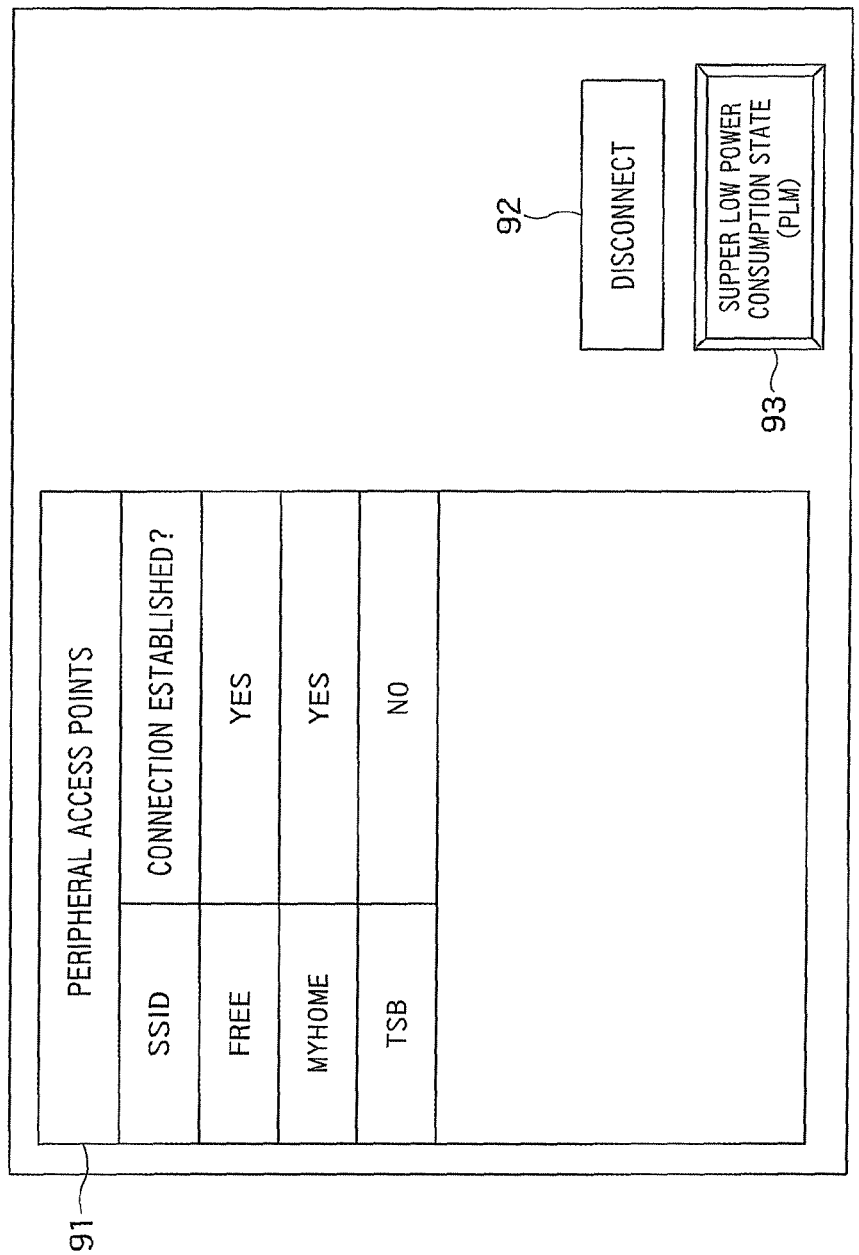
FIG. 13 shows an example of a display screen that includes a peripheral access point display, a connection state display, and a mode display.

An example of that display is shown in FIG. 13. In the screen example in FIG. 13, a peripheral access point display 91 and a connection state display 92 are included, and in addition, a power save mode setting button 93 is displayed.

The connection state display 92 displays either of "disconnection" and "connection" in accordance with presence/absence of an association. In addition, in a case of the "connection" display, it is desirable that an SSID of the connected access point is displayed. In addition, a BSSID of the connected access point may also be displayed at the same time.

The power save mode setting button 93 allows either of "PLM," "PSM," and "NORMAL" to be set. By pressing the button, a drop-down list is displayed, and any one of these settings is selected from the list. Further, the selected setting is displayed on a surface of the button.

The peripheral access point display 91 displays based on information stored in the "P" register. In the case of the PLM, it is not that all the channels are scanned, but it is desirable to display information on the access points of all the channels by holding the content of the "P" register in the working memory (FIG. 4) for a predetermined period. In FIG. 13, displayed is that access points "FREE," "MYHOME," and "TSB" have been found through a scan, and of these, connection information (authentication information such as an SSID and a WEP key) of "FREE" and "MYHOME" has already been set (YES) in the communication terminal 1. In Step S17 (a smiley face) in FIG. 3, in a case of automatically connecting to an access point in which connection information has already been set, of "FREE" and "MYHOME," automatic connection is carried out to an access point of higher priority set in advance.

In addition, as another display example, for example, in an example in FIG. 10, in a case where there is no association in the PLM state, it is possible to notify a user of that it is in such a state that a screen display where new communication occurs is not possible by graying out the next mail button. Even in a case where there is no association, in a case where, for example, a mail text has already been acquired, it is not necessary to gray out the previous mail button or the next mail button.

Thus far, according to the present embodiment, it becomes possible to reduce power consumption of the communication terminal by putting a power supply state of the communication device 15 to a state (PLM) where power consumption is lower than in an operating state (PSM or Normal) in a case where the application software is not carrying out communication. Further, when communication is necessary, since an association with an access point can be maintained, it is possible to start the communication immediately, and the convenience for a user is not lost.

(Application to Protocol Other than HTTP)

So far, a Web browser is assumed as the application software, it is possible to use other application software or a protocol other than the HTTP.

For example, in a case where the application software is mail software instead of a Web browser, POP3 (mail reception) and SMTP (mail transmission) are used as protocols. Either of the protocols uses a TCP connection. The POP3 establishes a TCP connection of a designation port number 110 and receives a mail using the following commands on this TCP connection (< > is a parameter for a command).

USER<user name>: User Name
PASS<password>: Password
LIST: Received Mail List Request TOP<message number><line number>: Mail Content Request of Number to Follow
RETR<message number>: Message Acquiring Request
DELE<message number>: Mail Delete Marking Request
QUIT: Transmission of Update (Reflect Update) of Session Close Request Specifically, the mail software carries out user authentication with the USER command and the PASS command after the TCP connection is established. After the authentication, a list of received mails (message numbers and data sizes) is acquired with the LIST command. With the TOP command, a mail is specified by a message number, and further, data for the specified number of lines are acquired. By executing the TOP command for the specified number of steps in the mail list acquired with the LIST command, a received mail list screen similar to FIG. 9 can be displayed. While a user is searching for a mail to read, a power supply state of the communication device 15 is put in "D3" with the TCP connection being kept established, whereby power consumption of the communication terminal can be reduced. When the user selects a mail to read, the power supply state of the communication device 15 is put in "D0," and an entire mail message which the user has selected is acquired by transmitting the RETR command using the TCP connection. After acquisition, the power supply state of the communication device 15 is changed to "D3," and a screen in FIG. 10 is displayed.

This operation will be described using FIG. 5. In place of the HTTP processing unit 41, an SMTP processing unit and a POP processing unit are provided. Each of the SMTP processing unit and the POP processing unit sends, to the communication managing unit 34, communication activity information ((an SMTP session start notification, an SMTP session end notification), (a POP session start notification, a POP session end notification)).

Upon receiving a session start request from the application software, the communication managing unit 34 sends, to the device power managing unit 35, a power supply state setting request (PSM) or a power supply state setting request (Normal) of the communication device 15.

In addition, upon receiving a session end request for all of the received session start request, the communication managing unit 34 sends, to the device power managing unit 35, a power supply state setting request (PLM) of the communication device 15.

(Plurality of Applications)

Although only one piece of application software is indicated in FIG. 5, a plurality of pieces of application software may be executed. For example, a case where a Web browser and mail software are executed as the application software is considered.

In this case, the communication managing unit 34 receives a (Web/POP/SMTP) session start notification as communication activity information and sends a power supply state setting request (PSM) or a power supply state setting request (Normal) in a case where the power supply state of the communication device 15 is other than the PLM. When a (Web/POP/SMTP) session end notification is received as communication activity information, a power supply state setting request (PLM) is sent in a case where there is no session that has not ended (that is, in a case where all the sessions have ended). This presence/absence of a session that has not ended can be determined by matching a session start notification and a session end notification using (session identification information, process identification information) included in the communication activity information.

(Transition Timing Control to PSM/NORMAL State)

When a session start notification is received from the application software, the communication managing unit 34 can delay transmission of a power supply state setting request (PSM) or a power supply state setting request (Normal) until another session start notification is received. Through this, start timings of a plurality of communication sessions can be synchronized, and time in which the communication device 15 is in the "D0" state can be reduced. Thus, power consumption can be reduced.

Here, the communication managing unit 34 can, instead of always waiting for a second session start request, wait for transmission of a power supply state setting request (PSM) or a power supply state setting request (Normal) for a predetermined period after receiving a first session start request.

Alternatively, the application software can set a permitted delay time in a session start request, and the communication managing unit 34 can delay transmission of a power supply state setting request (PSM) or a power supply state setting request (Normal) for this permitted delay time.

Further, this permitted delay time may be set to a larger value as a remaining electricity level in the battery 17 held by the communication terminal 1 is lower. Through this, power consumption can be further reduced when a remaining battery level is lower.

(Setting to PSM/NORMAL with Timer)

It is desirable that the communication managing unit 34 sends a power supply state setting request (PSM) or a power supply state setting request (Normal) even when a session start request is not received, in a case where predetermined time elapses after transmitting a power supply state setting request (PLM). Through this, the communication terminal 1 can transmit a packet other than TCP such as a UDP or DHCP renew packet. It is desirable to return to the PLM when predetermined time elapses after transitioning into the PSM or the Normal.

Further, in a case where a Websocket is used, when the communication device 15 comes into the PSM or Normal state, a communication terminal on another end is notified of that it is in the reception allowed state, and a packet can be received from the terminal on another end.

In addition, in a case where a transmission request of a packet other than the TCP such as a UDP or DHCP renew packet occurs when the communication device 15 is in the "D3" state, it is desirable to do as follows. That is, it is desirable that the communication managing unit 34 puts in a power supply state setting request (PSM) or a power supply state setting request (Normal) even when a session start request is not received when a predetermined time elapses after that packet transmission request occurs.

At this time, a distinct waiting time may be set in advance in each of these packets other than the TCP. In this case, it is also possible to send a power supply state setting request (PSM) or a power supply state setting request (Normal) when the waiting time corresponding to that packet elapses after the packet transmission request occurs. In this case, it is desirable that the communication managing unit 34 sends a power supply state setting request (PLM) after a predetermined time further elapses.

(Method for Grasping Communication Activity)

So far, the communication managing unit 34 receives communication activity information from the application software, but it is also possible to receive this communication activity information from the device driver 33, the IP processing unit 32, or the TCP processing unit 31. In this case, by equipping the device driver 33, the IP processing unit 32, or the TCP processing unit 31 with a function to analyze a session request and a session response, the communication managing unit 34 can carry out processing similar to the above.

Alternatively, it is also possible to put in the PLM state in a case where there is no established TCP connection and put in the PSM or NORMAL state in a case where there is an established TCP connection. In this case, it is desirable that the TCP processing unit 31 sends the communication activity information to the communication managing unit.

Alternatively, the communication managing unit 34 may infer the communication activity information based on presence/absence of transmission and reception of a packet. Through this, the communication managing unit 34 can carry out processing similar to the above.

(Connection Other Than TCP Connection)

So far, the description is given taking the TCP connection as an example, but it is also possible to target a connection other than the TCP connection. For example, it is also possible to target an IPSEC connection of IPSEC communication. In the IPSEC communication, a state called a security association is maintained between transmitting and receiving terminals. This means that the IPSEC communication carries out connection type communication similarly to the TCP. To establish this security association, an IKE (Internet Key Exchange) protocol is typically used. This protocol has a large number of messages to be processed, and there is a case where public key cryptography processing is included in processing or the like, and thus a processing load is high. Therefore, when reestablishing an IPSEC connection (security association), an establishing processing delay is large, and power consumption due to a processing load is large.

Thus, the communication device 15 is transitioned into the PLM state with the IPSEC connection (security association) being maintained when there is no transmitting or receiving packet and is returned to the PSM or Normal state only at the time of communication. Through this, maintaining the convenience and reducing power consumption can both be achieved.

In addition, when the communication device 15 is in the PLM state and a software expiration of the security association is reached even without a communication, the communication device may be returned to the PSM or the Normal, and a renegotiation of the security association may be carried out with the terminal on another end to maintain the connection. Thereafter, it is desirable to transition into the PLM.

Note that the above-described IPSEC tunnel is an example, and it is also possible to target another tunnel. Specifically, a variety of other tunnel protocols such as a GRE (Generic Routing Encapsulation) tunnel, an L2TP tunnel, or a PPTP are possible.

(Cooperation with User Operating Activity)

A state control according to the present embodiment can be put in cooperation with operation information by a user. For example, in FIG. 5, when the OS receives a user event from the outside, it is also possible to transition the communication device 15 from the PLM state to the PSM or Normal state.

For example, in a case where a user does not operate the communication terminal 1 for a predetermined period, a liquid crystal display included in the communication terminal 1 is transitioned into a low power consumption state by turning off a backlight or the like. At this time, the communication device 15 is put in the "D3" state. Then, the backlight of the liquid crystal display is thereafter turned on as a user touches a touch panel or the like, and the communication device 15 is put in the "D0" state when a screen is presented to the user.

This enables to transmit and receive a UDP or DHCP packet, and presence/absence of a peripheral printer or a UPnP device can be displayed on the liquid crystal display. When a screen is not displayed to the user, an operation for finding a device or a service as such is not necessary. Thus, when a screen is not displayed, power consumption can be reduced by putting the communication device 15 in the PSM or Normal state. In addition, by putting the communication device 15 in the PLM state at a timing at which a screen is displayed to the user, a waiting time for providing a user with a communication service can be reduced. Thus, the convenience for the user and the lower power consumption can both be achieved.

In the above-described example, an operation of a touch panel is treated as an external event, but aside from that, it is also possible to use sensing information obtained with a sensor other than the communication device. For example, a frequency of pressing a button, a change in brightness of the surroundings detected by an illuminance sensor, a volume of sound detected by a microphone, or a remaining battery level can also be used.

(Other)

In the present embodiment, the description is given taking a case where IPv4 communication is carried out as an example, but without being limited thereto, the present embodiment can also be applied to a variety of packet communication such as IPv6 and X.25.

In addition, in the present embodiment, a terminal called an infrastructure mode of IEEE 802.11 carries out transmission and reception of a frame with an access point. Aside from this, the present embodiment can also be applied to modes called an ad hoc mode or WiFi Direct where terminals transmit and receive a frame to and from each other. In the ad hoc mode, a state where authentication is complete and an encrypting packet can be transmitted or received is considered to be a state where a session is established.

In addition, in the present embodiment, the description is given taking IEEE 802.11 as an example, but the present embodiment can also be applied to other communication schemes where a connecting relationship such as an association is established with the communication terminal on another end and a frame is transmitted or received only while the connecting relationship is established. Specifically, Bluetooth (Registered Trademark) or ZigBee can be cited. In Bluetooth (Registered Trademark), a connecting state after having exchange of a page request and a response can be considered as a state where an association is established. In ZigBee, one that is established or released by an association/disassociation operation can be considered as an association. Further, even in a communication scheme where an explicit connecting state is not present at the MAC level as in a wired Ethernet (Registered Trademark), in a network where, for example, authentication information is exchanged with communication equipment as in RFC 5191 and a frame is forwarded only in a state where the authentication is complete, an authentication state is considered as establishment of a connecting state, that is, establishment of an association, and the present invention can be applied similarly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication terminal in which a plurality of communication protocols are executed, the communication terminal comprising:
a communication device configured to form an association with communication equipment and communicate with the communication equipment based on the association;
a communication managing unit configured to decide an operational mode of the communication device; and
a device power managing unit configured to control power state of the communication device in accordance with an operational mode decided by the communication managing unit,
wherein the device power managing unit sets, when a first operational mode is decided by the communication managing unit, the communication device in a first power state, the first power state being a state in which transmission and reception are not allowed, and then transitions a power state of the communication device from the first power state to a second power state at a first cycle temporarily during when the communication device is in the first power state, the second power state being a state in which transmission and reception are allowed, and
wherein the communication terminal selects a frame based on an execution situation of the plurality of communication protocols when the communication device is set in the second power state, and
the communication terminal returns the communication device to the first power state after receiving a response frame to the selected frame.

2. The communication terminal according to claim 1, wherein the device power managing unit returns the communication device to the first power state after a first period elapses from when the second power state is set.

3. The communication terminal according to claim 1, wherein the communication device discards the association in a case where the response frame is not received.

4. The communication terminal according to claim 1, wherein the device power managing unit transitions, in a case that the first power state is set due to the first operational mode, a power state of the communication device from the first power state to a third power state at a second cycle for a second period where reception is allowed, and
wherein the communication device tries to receive a beacon that includes a presence notification of communication equipment with a predetermined channel in the second period.

5. The communication terminal according to claim 1, further comprising:
a connection processing unit configured to establish a connection with the communication equipment or establish a connection with a first communication terminal through the communication equipment which carries out a relay,
wherein the communication managing unit decides an operational mode of the communication device to the first operational mode when the connection is released.

6. The communication terminal according to claim 1, further comprising:
a connection processing unit configured to establish a connection with the communication equipment or establish a connection with a first communication terminal through the communication equipment which carries out a relay,
wherein the communication managing unit decides an operational mode of the communication device to the first operational mode when it is detected that a session on the connection has ended.

7. The communication terminal according to claim 1, further comprising:
a display unit configured to display whether or not the association is being formed when the communication device is in the second power state.

8. A communication method performed in a communication terminal in which a plurality of communication protocols are executed, the method comprising:
forming an association between a communication device in the communication terminal and communication equipment and communicating with the communication equipment based on the association;
deciding an operational mode of the communication device;
controlling feeding of power to the communication device in accordance with an operational mode decided;
setting, when a first operational mode is decided, the communication device in a first power state, the first power state being a state in which transmission and reception are not allowed, and then transitioning the communication device from the first power state to a second power state at a first cycle temporarily during when the communication device is in the first power state, the second power state being a state in which transmission and reception are allowed;
selecting a frame based on an execution situation of the plurality of the communication protocols when the communication device is set in the second power state, and transmitting the selected frame via the association; and
returning the communication device to the first power state after receiving a response frame to the selected frame.

9. The communication terminal according to claim 1, wherein
the association is formed according to a first protocol of the communication protocols,
a communication protocol of the selected frame is a second protocol of the communication protocols, and
the second protocol is different from the first protocol.

10. The communication terminal according to claim 9, wherein
the first protocol is a communication protocol compliant with IEEE 802.11, and
the second protocol is one of TCP, IPSEC, Websocket, ICMP, IKE, GRE, L2TP, PPTP, UDP and DHCP.

* * * * *